United States Patent [19]

Nelsen et al.

[11] Patent Number: 5,305,495
[45] Date of Patent: Apr. 26, 1994

[54] PEST TRAP FOR VACUUM DEVICE

[76] Inventors: Phillip A. Nelsen, 8999 Summerhill Point, Alpine, Calif. 91901; Fred M. Nelsen, 402 Northgate Dr., Modesto, Calif. 95350

[21] Appl. No.: 64,481
[22] Filed: Nov. 27, 1992
[51] Int. Cl.⁵ .......................... A01M 1/06; A47L 9/12
[52] U.S. Cl. .................................... 15/414; 15/347; 15/415.1; 43/139
[58] Field of Search ............. 15/339, 347, 414, 415.1; 43/139

[56] References Cited

U.S. PATENT DOCUMENTS

| | | | |
|---|---|---|---|
| 1,517,131 | 11/1924 | Thompson | 43/139 |
| 2,340,944 | 2/1944 | Easter | 43/139 |
| 2,823,410 | 2/1958 | Aleo | 15/414 X |
| 2,908,933 | 10/1959 | Todd et al. | 15/414 |
| 3,015,122 | 1/1962 | Cook | 15/327.4 |
| 3,238,556 | 3/1966 | Martin | 15/415.1 X |
| 3,965,608 | 6/1976 | Schuman | 43/110 |
| 4,074,458 | 2/1978 | Catlett | 43/139 |
| 4,279,095 | 7/1981 | Aasen | 43/139 |
| 4,282,673 | 8/1981 | Focks et al. | 43/113 |
| 4,607,451 | 8/1986 | Jarecki | 43/139 |
| 4,817,330 | 4/1989 | Fahringer | 43/133 |
| 4,918,857 | 4/1990 | Wade et al. | 15/344 X |
| 4,979,330 | 12/1990 | Rorant | 43/139 |
| 5,052,147 | 10/1991 | Broomfield et al. | 43/139 |
| 5,267,372 | 12/1993 | Jones | 15/415.1 X |

Primary Examiner—Chris K. Moore
Attorney, Agent, or Firm—Henri J. A. Charmasson

[57] ABSTRACT

An apparatus for collecting insects or small objects combines a vacuum cleaner and a disposable trap made of paper and mounted in the intake orifice of the vacuum cleaner hose. a frusto-conical funnel is wedged into the mouth of the trap to secure it and to prevent its collapsing under suction of the vacuum. The trap has a flap to confine the collected items for disposal or preservation.

7 Claims, 1 Drawing Sheet

PEST TRAP FOR VACUUM DEVICE

FIELD OF THE INVENTION

The present invention relates to portable, manually operated suction devices for capturing small items such as insects.

BACKGROUND OF THE INVENTION

The typical housekeeper having to rid a room of a spider and its web will use a broom to remove the web and a fly swatter to kill the escaping spider. He or she may also use a vacuum cleaner to suck the insect and its web. However, there is a good chance that the spider will eventually come out of the vacuum cleaner bag and reinstall itself on the premises. There are occasions where one may be reluctant to kill the insect, and other occasions where the insect must be preserved for entomological study or for reintroduction in another area.

SUMMARY OF THE INVENTION

The principal and secondary objects of this invention are to provide a simply and inexpensive disposable trap which can conveniently be used in connection with a vacuum suction apparatus for collecting or removing small items such as insects for disposal or preservation without necessitating a human contact with the collected object or animal.

These and other objects are achieved by means of a simply conical trap made of thin paper which can be sealed after use and is combined with a inexpensive frusto-conical funnel used to wedge the conical trap in the intake orifice of a vacuum suction device.

DESCRIPTION OF THE PREFERRED EMBODIMENT OF THE INVENTION

Figure 1:
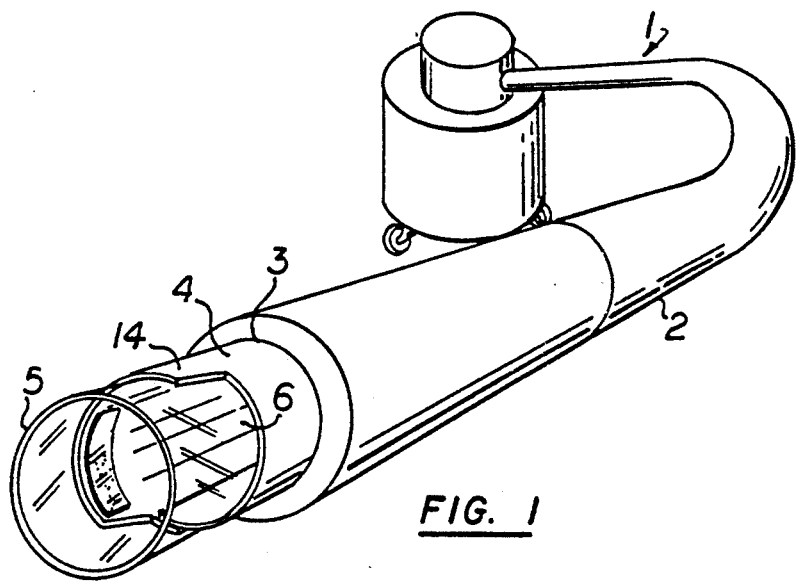
FIG. 1 is a perspective view of a vacuum insect trap apparatus according to the invention.

Referring now to the drawings, there is shown in FIG. 1 a vacuum cleaner 1 having a hose 2 terminated at its distal end by a circular intake orifice 3 of a certain diameter D which preferably falls within the range from 2 to 10 centimeters. Partially inserted in the intake orifice is a conical insect trap 4. A frusto-conical funnel 5 has its smaller end inserted into the open base 6 of the conical trap. The frusto-conical funnel 5 is shown transparent for the sake of clarity.

Figure 2:
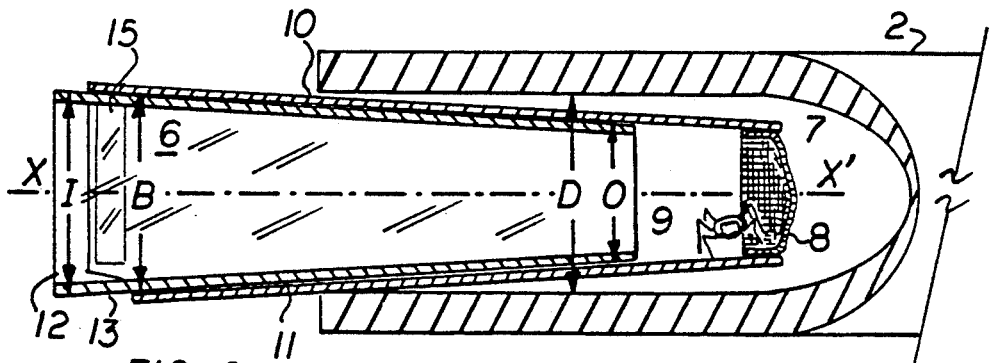
FIG. 2 is a cross-sectional view of the trap assembly.

As more specifically shown in FIG. 2, the trap 4 comprises a frusto-conical body made of a sheet-like, pliable material such as paper which has an open base 6, and an aperture 7 near the apex closed by a piece of screening material 8 with a mesh small enough to retain an insect such as a spider 9 which may have been sucked into the trap. The diameter B at the base 6 of the trap is larger than the inside diameter D of the hose intake orifice 3, so that the trap itself cannot be sucked into the hose 2. The funnel 5 made of semi-rigid paper or plastic. The outer diameter I at the larger intake end 12 of the funnel is larger than the diameter B of the trap base. The outer diameter 0 at the smaller end is lesser than the inside diameter D of the hose. Thus the funnel can be wedged into the open base 6 of the trap to prevent the paper-thin trap from collapsing and being sucked into the hose 2. The walls of the trap 4 and the funnel have substantially the same tapering angle with their common axis X-X'. Accordingly, a median section 10 of the trap 4 is securely clamped between the inner wall of the hose intake orifice 3 and the outer wall 11 of the funnel 5. A section 13 of at the distal end of the funnel extends out of the trap base orifice 6. This provides an even, circular mouth for the vacuum-trapping device which is more rigid than the edges of paper-thin base orifice 6 of the trap itself. Furthermore, this allows some room for a sealing flap 14 for the trap which extends from approximately one-half of the peripheral edge of the trap base orifice 6. This flap has a streak 15 of tacky compound spread over its inner face. The flap can be folded over the other half of the peripheral edge of the base orifice after the trap has been pulled out to seal its contents.

Figure 3:
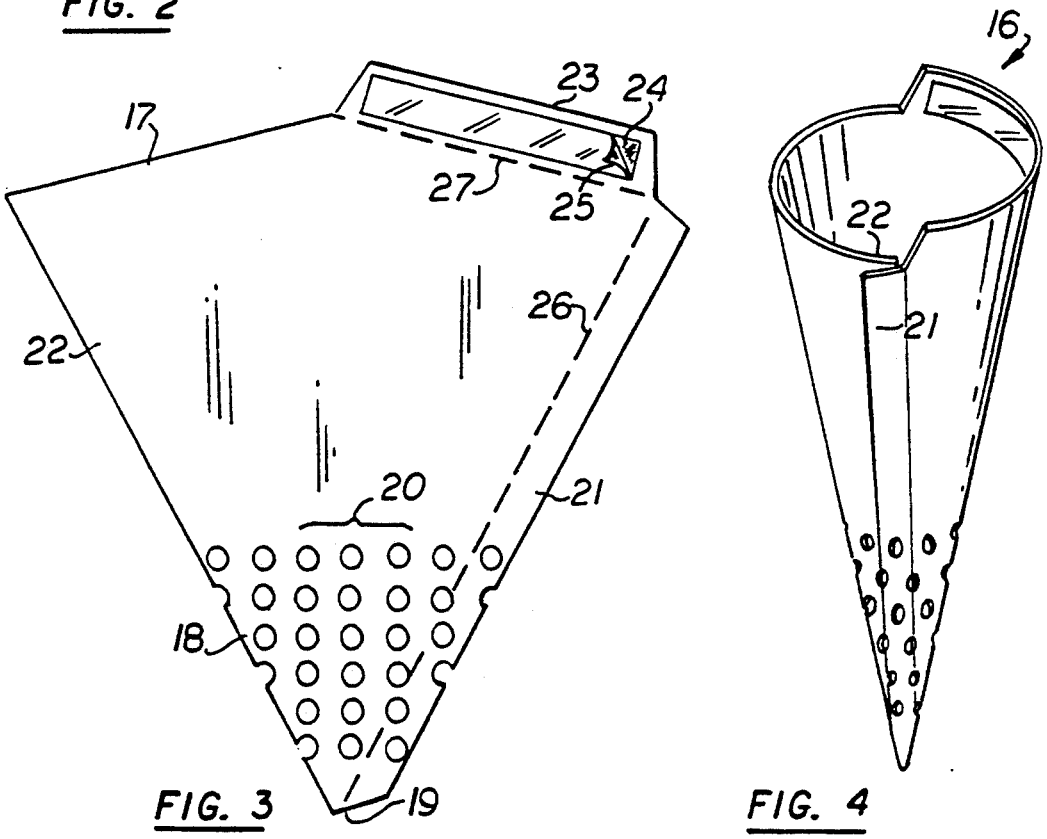
FIG. 3 is a top plan view of a simplified embodiment of the trap before assembly.
Figure 4:
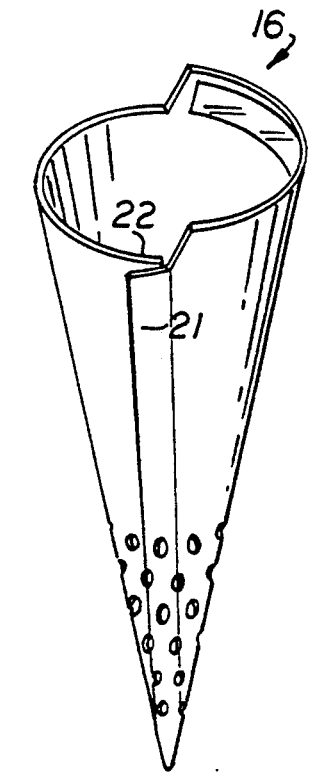
FIG. 4 is a perspective view of the assembled trap.

FIGS. 3 and 4 illustrate a simple process for manufacturing a trap 16 from a sheet of paper 17 cut into the arrowhead shape illustrated in FIG. 3. A section 18 of the sheet near the apex 19 has a plurality of perforations 20 which are small enough to retain the targeted insect into the trap. A first flap 21 is provided along a lateral edge for bonding to the opposite lateral edge 22. A second flap 23 is provided along one-half of the base for sealing the trap after use. A streak of tacky substance 24 on the inside surface of the second flap is temporarily covered by a strip of film 25 which can be peeled away to expose the tacky material. The flaps fold lines 26, 27 are shown in broken line on the drawing.

The tapering angle of the trap 4 and funnel 5 should not exceed 40 degrees and may vary preferably from 15 degrees for a vacuum hose orifice diameter of 2 centimeters to 40 degrees for a intake orifice diameter of 10 centimeters. The length of the trap and of the funnel may vary from 5 centimeters to 15 centimeters over the same range of hose intake orifice diameters.

While the preferred embodiments of the invention have been described, modifications can be made and other embodiments may be devised without departing from the spirit of the invention and the scope of the appended claims.

What is claimed is:

1. In combination with a vacuum suction apparatus having a substantially circular intake orifice of a certain diameter, a device for collecting items sucked into said orifice, which comprises:

a conical trap partially inserted through said intake orifice, said trap being made of sheet-like, pliable material having a tapering angle of no more than 40 degrees, an open base having an aperture diameter greater than said intake orifice diameter, and an air-permeable area having a plurality of perforations, said perforations being sized to retain said items in said trap; and a frusto-conical funnel having at one end an inlet with an outer diameter greater than said base aperture diameter and at an opposite end an outlet with an outer diameter smaller than said intake orifice diameter, and a tapering angle no greater than the tapering angle of said conical trap, said funnel being forcibly inserted into said base aperture to wedge said trap into said intake orifice.

2. The combination of claim 1, wherein said conical trap comprises a sealing flap extending from a first peripheral half of the open base.

3. The combination of claim 2, wherein the diameter of said intake orifice falls within a range of 2 to 10 centimeters; and the tapering angle of said conical trap falls within a corresponding range of 15 to 40 degrees.

4. The combination of claim 3, wherein said conical trap is made of paper.

5. The combination of claim 4, wherein said funnel is made of semi-rigid paper.

6. The combination of claim 4, wherein said air-permeable area comprises a section of screening cloth across a truncated apex section of the conical trap.

7. The combination of claim 2, wherein said flap comprises a streak of tacky material for bonding said flap to an opposite second peripheral half of the open base.

* * * * *